(12) United States Patent
Schmitz (10) Patent No.: US 11,006,657 B2
(45) Date of Patent: May 18, 2021

(54) MEAT AGING CHAMBER AND SYSTEM UTILIZING A COMMUNICATIONS NETWORK

(71) Applicant: Claus Schmitz, San Diego, CA (US)

(72) Inventor: Claus Schmitz, San Diego, CA (US)

( * ) Notice: Subject to any disclaimer, the term of this patent is extended or adjusted under 35 U.S.C. 154(b) by 276 days.

(21) Appl. No.: 16/235,126

(22) Filed: Dec. 28, 2018

(65) Prior Publication Data

US 2019/0133165 A1 May 9, 2019

Related U.S. Application Data

(63) Continuation-in-part of application No. 14/874,461, filed on Oct. 4, 2015, now abandoned.

(51) Int. Cl.
| | |
|---|---|
| *A23L 13/70* | (2016.01) |
| *H04L 29/08* | (2006.01) |
| *F25D 17/04* | (2006.01) |
| *F25D 29/00* | (2006.01) |
| *G05D 22/02* | (2006.01) |
| *G05D 23/19* | (2006.01) |

(Continued)

(52) U.S. Cl.
CPC ........... *A23L 13/76* (2016.08); *A23B 4/03* (2013.01); *A23B 4/06* (2013.01); *F25D 17/042* (2013.01); *F25D 17/062* (2013.01); *F25D 29/00* (2013.01); *F25D 29/008* (2013.01); *G05D 22/02* (2013.01); *G05D 23/1917* (2013.01); *H04L 67/025* (2013.01); *F25D 2317/04111* (2013.01); *F25D 2317/04131* (2013.01); *F25D 2400/361* (2013.01); *F25D 2500/04* (2013.01); *F25D 2600/02* (2013.01); *F25D 2600/06* (2013.01); *F25D 2700/12* (2013.01)

(58) Field of Classification Search
None
See application file for complete search history.

(56) References Cited

U.S. PATENT DOCUMENTS

| | | | | |
|---|---|---|---|---|
| 5,657,720 A | * | 8/1997 | Walters ................. | A01K 41/00 |
| | | | | 119/317 |
| 6,034,607 A | * | 3/2000 | Vidaillac ................. | G01K 1/14 |
| | | | | 340/529 |

(Continued)

*Primary Examiner* — Tu B Hoang
*Assistant Examiner* — Masahiko Muranami
(74) *Attorney, Agent, or Firm* — Continuum Law; Robert P. Cogan (57) ABSTRACT

A meat aging chamber suitable for residential or portable use is provided. An aging apparatus comprises a refrigerated aging cabinet having a climate created by environmental apparatus. A server in a cloud resource communicates with a control circuit in the aging apparatus and with a portable interactive device. In a setup mode the portable interactive device communicates with a control circuit in the aging apparatus via a communications interface to identify the user to the control circuit. In an operating mode the communications interface enables communication between the cloud resource and the control circuit. A sensor module provides current values to the cloud resource for controlling operation in accordance with a software program embodying the aging protocol. The cloud resource can inform the smartphone of aging progress and alarm conditions. Physical features enable embodying the functions of a commercial aging chamber in a residential sized unit.

7 Claims, 9 Drawing Sheets

(51) Int. Cl.
*F25D 17/06* (2006.01)
*A23B 4/06* (2006.01)
*A23B 4/03* (2006.01)

(56) References Cited

U.S. PATENT DOCUMENTS

| | | | |
|---|---|---|---|
| 6,455,094 B1 * | 9/2002 | Ball | A23B 5/0052 426/298 |
| 2008/0095905 A1 * | 4/2008 | Sells | F24C 15/327 426/510 |
| 2008/0145491 A1 * | 6/2008 | Braeken | A23B 5/0052 426/241 |
| 2008/0196427 A1 * | 8/2008 | Bianchi | F25D 17/042 62/176.6 |
| 2010/0154452 A1 * | 6/2010 | McCann | A23L 13/70 62/247 |
| 2010/0310736 A1 * | 12/2010 | Burke | A23B 4/015 426/248 |
| 2011/0232304 A1 * | 9/2011 | Bortoletto | F25D 17/042 62/78 |
| 2014/0148969 A1 * | 5/2014 | Graziano | G05D 23/1905 700/300 |
| 2014/0201256 A1 * | 7/2014 | Pinheiro | H04M 1/72533 709/201 |

* cited by examiner

MEAT AGING CHAMBER AND SYSTEM UTILIZING A COMMUNICATIONS NETWORK

CROSS-REFERENCE TO RELATED APPLICATIONS

This patent application is a continuation-in-part of U.S. patent application Ser. No. 14/874,461 entitled Method and Apparatus for Aging Meat filed on Oct. 4, 2015.

FIELD

The present subject matter relates to aging of meat and more particularly to an apparatus suitable for domestic use and a system wherein the apparatus interacts with a cloud resource and a user-operated interactive device of interaction of the apparatus with a user and a control system.

BACKGROUND

Aging of meat is a process in which moisture is reduced and in which natural enzymes are allowed to tenderize the meat. Prior art methods do not provide for control of the process other than providing a linear set of steps that are timed and followed. Meat aging apparatus has not been built in a manner to be readily accessible to consumers. Typical meat tenderizing apparatus is large enough to handle commercial qualities of meat.

U.S. Pat. No. 7,998,517 discloses a process for dry aging meat in an enclosed, atmosphere-controlled room with forced circulation, containing a stainless steel salt rack with a salt brick stack covering one wall. A plurality of unwrapped and uncovered meat is placed on a meat rack. During the aging process, the meat pieces are moved toward the salt rack in steps. Each step lasts a preselected number of days. The process continues to the end of the aging period. Due to complication of construction and operation, this aging process is unsuitable for general consumer use.

United States Patent Application Publication Number 2014/0037829 discloses a method of dry aging meat including covering an exposed portion of the meat with at least one layer of fat and/or bone that is separate from the meat. The layer of fat and/or bone is kept on the meat for duration of aging. The need to cover the meat increases expense and decreases reliability.

U.S. Pat. No. 4,772,480 discloses controlling the aging or maturing of edible material such as meats, fish, dairy products, cereals, etc. by keeping the edible material in the presence of a freezing point depressing agent and an extract from the edible material at a temperature ranging from 0° C. to the freezing point of the material in order to accomplish aging. This aging process is unsuitable for general consumer use.

Refrigerated meat aging chambers originated with meat processing facilities. Large meat aging chambers are built into large restaurants. Residential-sized aging chambers have not been provided. The direction in the art has not been to design a residential meat aging chamber. Designs for residential use have started with the use of a refrigerator and adapting the residential refrigerator for use for meat aging.

The prior art is replete with journal articles teaching consumers how to adapt a residential refrigerator for use as an aging chamber. While forms of aging can be performed with this adaptation, it is still a refrigerator. A refrigerator, even if modified, is not a reliable aging apparatus. An aging chamber requires a substantially constant temperature. A nominal temperature for aging is 36° F. Various factors render a refrigerator unsuitable for this purpose. A refrigerator is opened and closed frequently. Each time a refrigerator door is opened and then closed, refrigerator temperature will change. Even precise thermostatic control will not compensate for temperature variations due to opening and closing of the refrigerator.

The thermostat turns the compressor on when the temperature reaches a first, higher level and turns the compressor off at a second, lower temperature. Nominal temperature swings may be, for example, 6° F. A hysteresis loop must be created because it is highly undesirable in a residential refrigerator to maintain a tight temperature tolerance because "cycling" will result. In other words the compressor will turn on and off frequently. A proper nominal temperature range varies ±1° F.

A refrigerator is subject to contamination by airborne bacteria when it is opened and also subject to contamination by foodborne bacteria in food placed on a shelf. Mold or other forms of bacterial deposits may form. The meat being aged may be rendered inedible. It may also become a health hazard. An aging chamber maintains a substantially constant airflow. A humidifier may be included in the aging chamber in order to maintain moisture at a desired level and to avoid an excess moisture level which could contribute to culturing bacteria.

SUMMARY

Briefly stated, in accordance with the present subject matter, a meat aging chamber suitable for residential or portable use is provided which includes communications between a user, a cloud resource, and an aging chamber.

An aging apparatus comprises a refrigerated aging cabinet having a climate created by environment apparatus. A server in a cloud resource, a control circuit in the aging apparatus, and a portable interactive device that may be operated by a user interact to implement an aging protocol. An app embodied in the smartphone identifies the user to the control circuit and enables communication with the cloud resource. A sensor module provides current values to the cloud resource for controlling operation in accordance with a software program embodying the aging protocol. The cloud resource can inform the smartphone of aging progress and alarm conditions. Physical features enable embodying the functions of a commercial aging chamber in a residential sized unit.

Current parameters values are maintained by the local control circuit. Desired parameter values may be initially set or modified via a communications link coupled to the cloud resource. The portable interactive device and the cloud resource exchange information regarding current commanded and actual parameter values. The cloud resource reports current conditions, aging progress, and other predetermined reports. The aging app defines duration of aging and values of parameters desired at various points along the aging timeline. Through the app, the user may vary operational parameters. The user may vary the aging process, accelerate it, or stop it. The user can monitor the aging process, react to alarm conditions, derive new relationships between data and results, and develop new aging routines.

The cost of the present system compared to commercial units is low. Consumers may purchase cuts of meat more cheaply than aged meat. The consumers benefit from aging meats by themselves. The method and apparatus may be used by consumers having ordinary culinary skills.

The method and apparatus may be used for aging in applications in which a user wishes to control parameters including time, temperature, humidity, and air flow.

DETAILED DESCRIPTION

An aging process may be viewed as a protocol which occurs over a preselected time span. Over the preselected time span, aging parameters are controlled. The protocol defines a desired value for each aging parameter at points along the timeline of the aging process. One widely used protocol is performed over a ten-day time span. Temperature, relative humidity, air movement, and general sanitation of the aging chamber are maintained. Aging parameters are kept constant over the time span. In a typical embodiment, temperature of an aging chamber is maintained at approximately 34 to 36° F., relative humidity at 85-90%, and air flow at 15 to 20 linear feet per minute at the surface of a product.

Staying within the boundaries of the aging protocol is important for achieving the desired result, namely a meat that will please a consumer. There is no universal ideal. One aging protocol will yield a steak, for example, that one person finds perfect and another person finds unsatisfactory. Restaurants and meat purveyors select widely acceptable protocols. In accordance with the present subject matter, a consumer may select a protocol customized to the consumer's taste. The consumer may even change the protocol in midstream.

Figure 1:
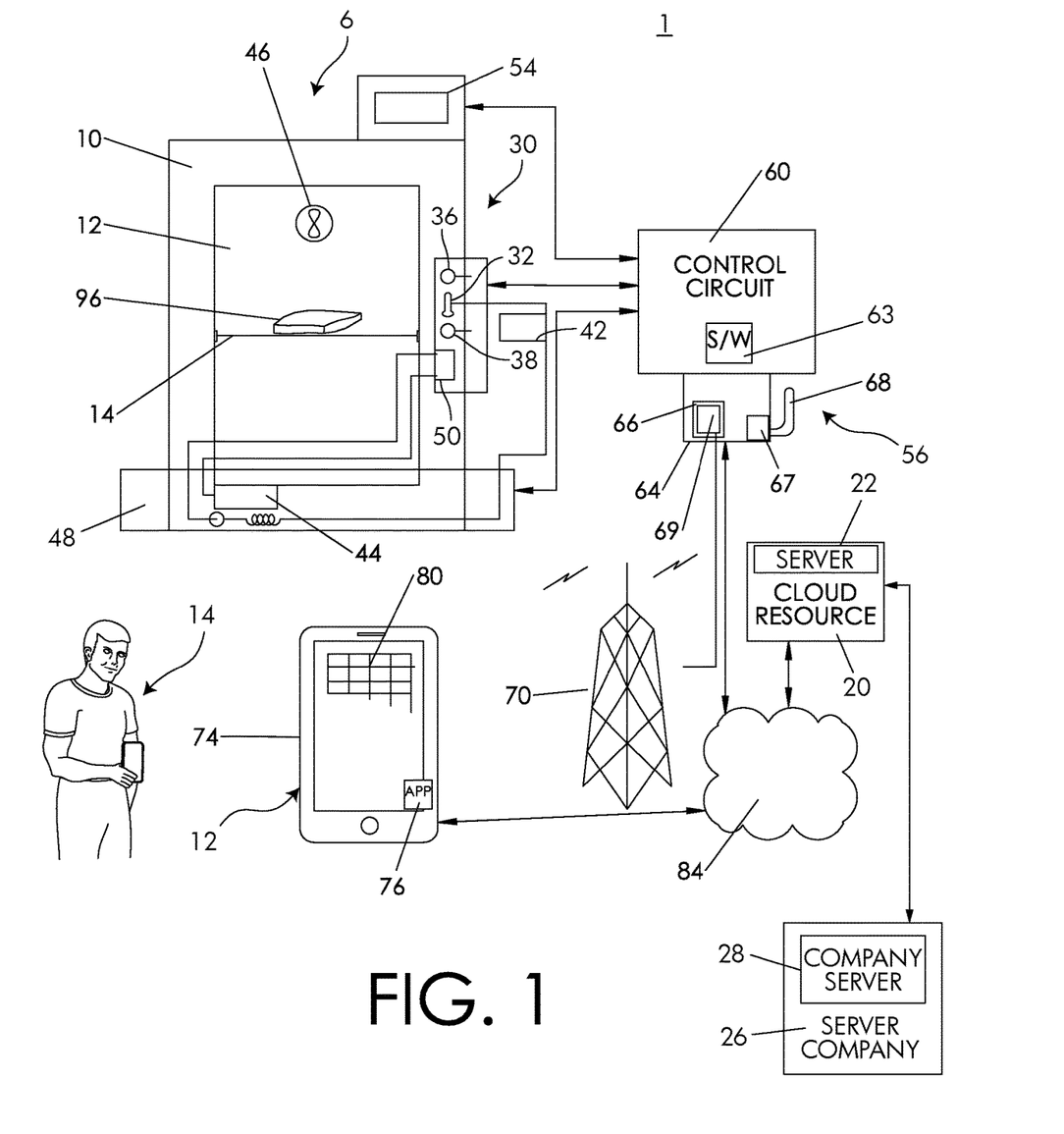
FIG. 1 is a block diagram of a system including the present subject matter.

FIG. 1 is a block diagram of a system including the present subject matter. The aging system 1 controls aging parameters. In the present description, "aging parameters" refers to selectable characteristics that are controllable to produce a desired result from the aging process. The aging system 1 comprises an aging apparatus 6 in the form of an aging cabinet 10. The aging cabinet 10 encloses an aging chamber 8. The aging chamber 8 is refrigerated. The aging cabinet 10 interacts with a cloud resource 20 and with a portable interactive device 12, e.g., a smartphone, which may be operated by a user 14. The aging cabinet 10, the portable interactive device 12 and the cloud resource 20 interact via a communications network 18. This communications network 18 interacts with the system 1. The cloud resource 20 preferably comprises a resource server 22. A service company 26 may communicate with the resource server 22 via a service company server 28. The service company 26 may interact with virtually any number of aging cabinets 10.

A support rack 14 is mounted in the aging chamber 8 to support meat. Other means of support could be provided. An instrumentation module 30 monitors conditions within the aging chamber 8. Many different sets of condition-sensitive sensors may be provided. In one preferred form, the sensors include a thermometer 32, a hygrometer 34, a timer 36, and a fan sensor 38. Conditions within the aging chamber 8 are produced by environment apparatus 40. The environment apparatus 40 may commonly comprise a refrigeration unit 48, a thermostat 42, a humidifier 44, a humidity sensor 50, and a fan 46. The refrigeration unit 48, the thermostat 42, the humidifier 44, the humidity sensor 50, and the fan 46 may each communicate with the control circuit 60 via a data bus 58. The environment apparatus 40 will produce desired levels of temperature, humidity, and airflow. Reports may be provided from and commands may be provided to local graphical user interface 54.

A control circuit 60 commands the environment unit 48 to produce conditions to achieve a desired aging result. A control processor 63 stores control software 62 which defines an aging program. The control software 62 is further described below. The control circuit 60 is coupled to communicate current and recorded data to a communications interface 64 in a communications module 56. The communications interface 64 may include various forms of apparatus. The communications interface 64 need not be a discrete unit. The communications interface 64 may be integrated into other circuits.

A Wi-Fi interface 67 transmits signals from the control circuit 60 to an antenna 68. Communication may be accomplished by networks, telephone systems, or other systems. In the present illustration, the communications interface 64 is coupled to a communications link 66. The communications link 66 will conveniently comprise a telephone modem 69 coupled to a cellular phone system 70. During setup, a smartphone 74 may communicate with the control circuit 60 via cellular phone system 70. The smartphone 74 may also communicate with the control circuit 60 via the Internet 84. The smartphone 74 communicates with the cloud resource 20 via the Internet 84.

An app 76 is installed in the smartphone 74 to receive and evaluate reports from the resource server 22 and to send commands to set parameter values. An app GUI 80 is provided for interactions between the smartphone 74 and the control circuit 60 in a setup mode. The smart phone communicates with the resource server 22 in an operating mode. An app is embodied in a non-transitory programmed medium which when executed on a digital processor causes the processor to perform the steps of the app.

Figure 2:
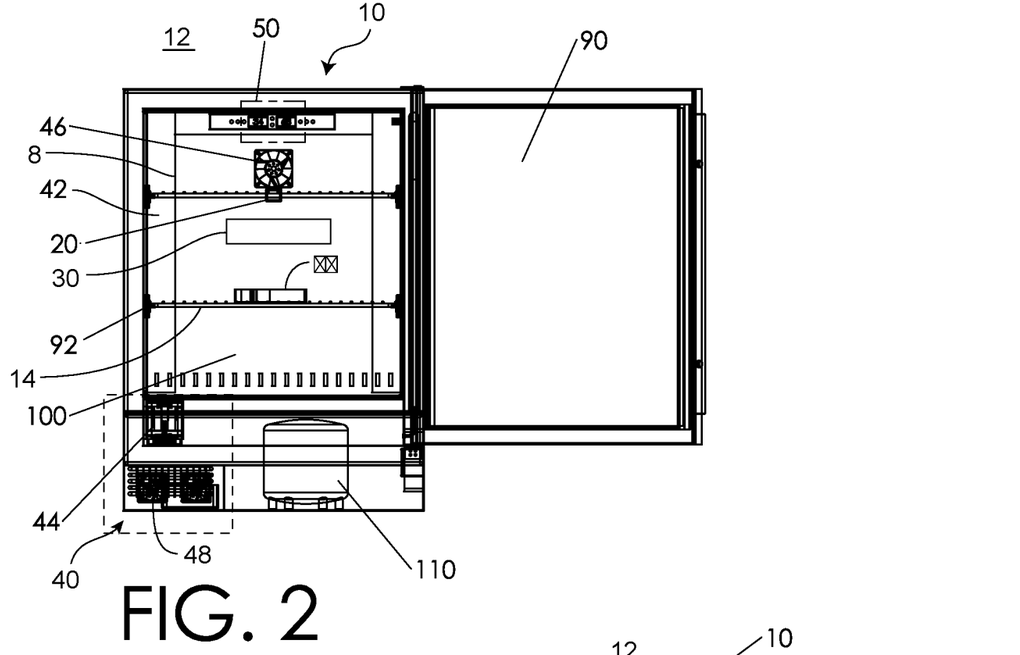
FIG. 2 is an elevation of an aging apparatus.
Figure 3:
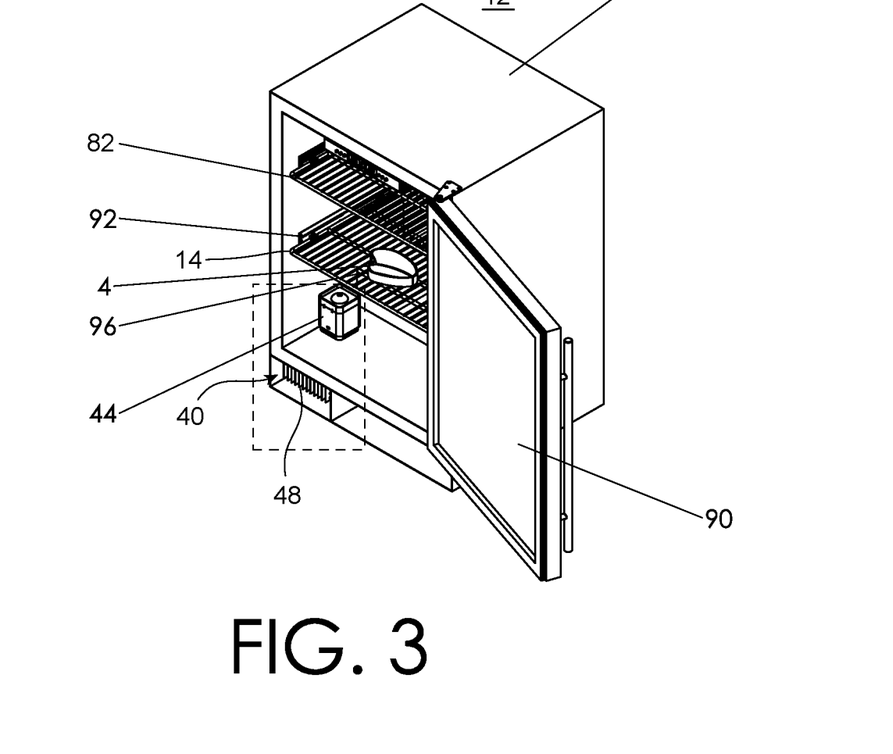
FIG. 3 is an isometric view of the aging apparatus.

FIG. 2 is an elevation of an aging apparatus 6 which includes an aging cabinet 10. FIG. 3 is an isometric view of the aging apparatus 6. FIG. 2 and FIG. 3 are taken together. The aging cabinet 10 is closed by a door 90. The support rack 14 is supported by slide means 92 or other support to maintain a product 96, usually a cut of meat, in a position to be in a desired airflow. The instrumentation module 30 may be mounted to a rear wall 100. The timer 36 (FIG. 1) may also be placed in the instrumentation module 30 or in the control circuit 60 (FIG. 1). The fan 46 is preferably mounted in the rear wall 100 of the aging chamber 8. The humidifier 44 is preferably placed in a lower portion of the aging chamber 8. The thermostat 42 may be located in the rear wall 100. The thermostat 42 is connected to selectively operate a refrigeration compressor 110 supported in a lower portion of the aging cabinet 10.

Many different forms of humidifier 44 may be provided. The humidifier 44 of the present embodiment is discussed further with respect to FIG. 5 below. One prior humidifier simply comprises a wick having one end exposed in the aging chamber 8 and a lower end immersed in a reservoir. In another form a fan blows across the top of a reservoir. In the present embodiment piezoelectric components are placed at a bottom of a reservoir to create mist, and a fan blows mist into the aging chamber 8.

In a residential-sized aging apparatus 6, the humidifier 44 communicates with a lower surface of the aging chamber 8. In commercial aging chambers, the humidifier may be located totally outside the chamber for operational interaction and accessibility. The humidifier 44 is located to provide humidity in a small space in an independent freestanding unit.

Figure 4:
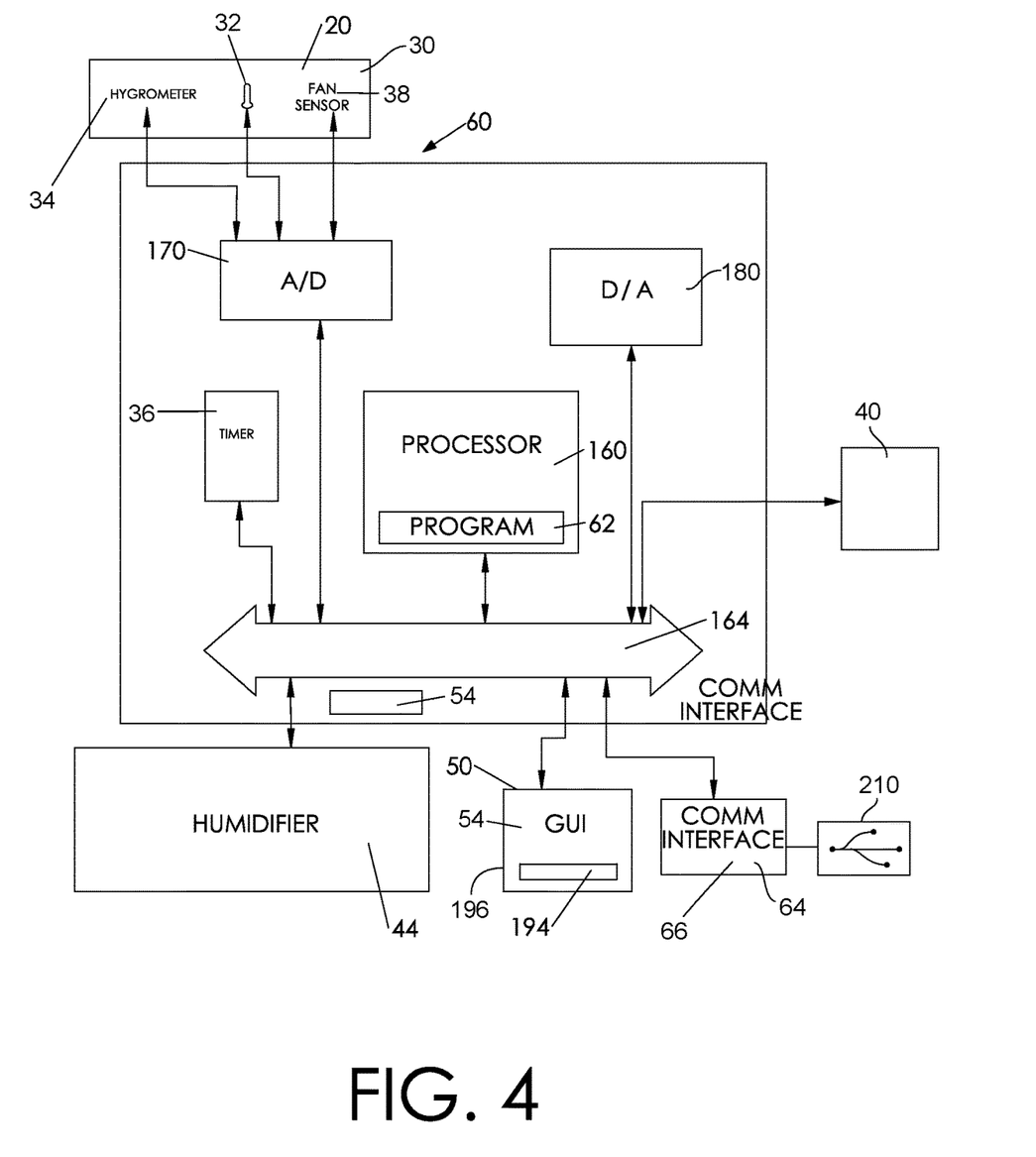
FIG. 4 is a block diagram of the control circuit.

FIG. 4 is a block diagram of the control circuit 60. The control circuit 60 comprises a processor 160. The control software 62 is loaded in the processor 160. The control software 62 produces interaction of inputs and outputs as further described below. Communication between components discussed below is made via a data bus 164. Inputs are provided to the control circuit 60 from the instrumentation module 30. These inputs include signals indicative of measurements from the thermometer 32, hygrometer 34, and the fan sensor 38. An analog to digital (A/D) converter 170 may be provided intermediate the instrumentation module 30 and the data bus 164. Most sensors on the market provide analog outputs. A sensor providing a digital output may be coupled directly to the data bus 164.

The timer 36 may be included in the control circuit 60. The processor 160 provides inputs to the timer 36 to determine duration of commanded operations. The timer 36 need not comprise a discrete component. The timer 36 may comprise a clock circuit within the processor 160. A digital to analog (D/A) converter 180 may couple commands from the processor 160 to the humidifier 44, fan 46, and compressor 110. The data bus 164 also provides outputs to the local graphical user interface (GUI) 54. The local GUI 54 may take many different forms. The local GUI 54 may comprise a display 194 in a housing 196. The housing 196 may be mounted to the aging cabinet 10 (FIG. 1). A plurality of local GUIs 54 may be provided so that a user may interact with the aging cabinet 10 at the aging apparatus 6 itself or at a selected remote physical location. Interaction may also be provided via the app GUI 80 (FIG. 1) at the smartphone 74 (FIG. 1).

The data bus 164 also communicates with the communications interface 64. Any number of techniques may be used to couple the communications interface 64 to the communications link 66. For example, the communication interface 64 may be connected to a USB port 210. The USB port 210 may be placed on a printed circuit board or a physical housing for the printed circuit board. The communications interface 64 may be located in the control circuit 60 within the aging cabinet 10. The communications link 66 could alternatively be located outside of the aging cabinet 10.

Figure 5:
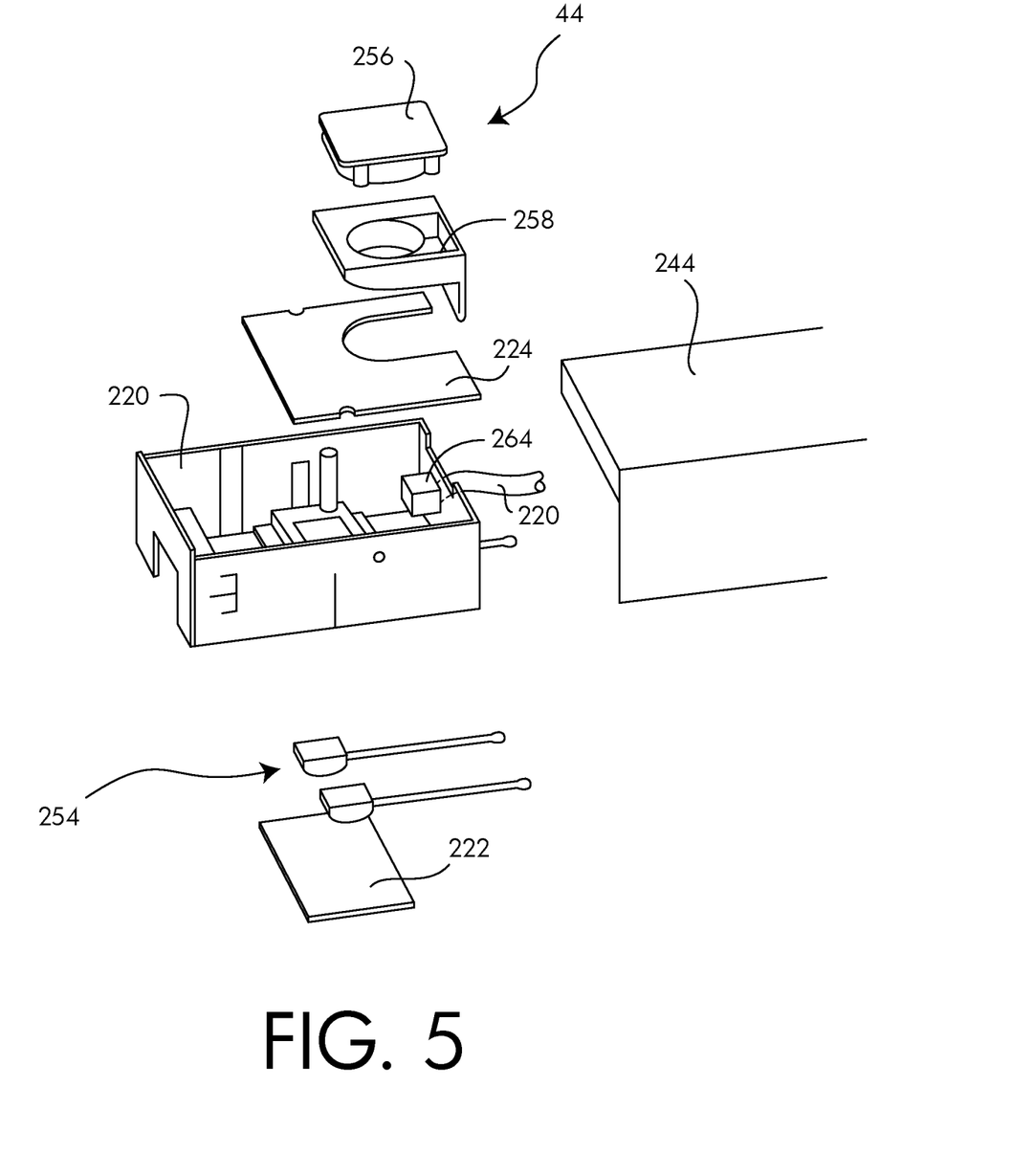
FIG. 5 is an exploded view of a humidifier included in the aging apparatus.

FIG. 5 is an exploded view of the humidifier 44 included in the aging apparatus 6. Humidifier 44 comprises a reservoir 220 with a lower cover 222 and upper cover 224. A water tank partition 244 separates the humidifier 44 within the aging chamber 8. An atomizer 254, preferably a piezoelectric element, is placed in the reservoir 220. A humidifying fan 256 is placed in a fan holder 258. The fan holder 258 is supported to the upper cover 224. Water is provided to the reservoir 220 via a hose 260 communicating with the reservoir 220. Admission of water into the reservoir 220 is permitted or blocked by a level sensor 264. Control of the level in the reservoir 220 is achieved in a manner analogous to providing water into ice makers or ice water reservoirs in a refrigerator.

The humidifier 44 receives information from the humidity sensor 50 and maintains a predetermined level of humidity as commanded by the aging protocol. The structure of FIG. 5 is particularly suited for a residential aging apparatus 6 due to its compact structure and capability of precise operation. The interaction of the humidifier 44 with the aging cabinet 10 is particularly advantageous in that precise and reliable humidity control is provided.

Figure 6A:
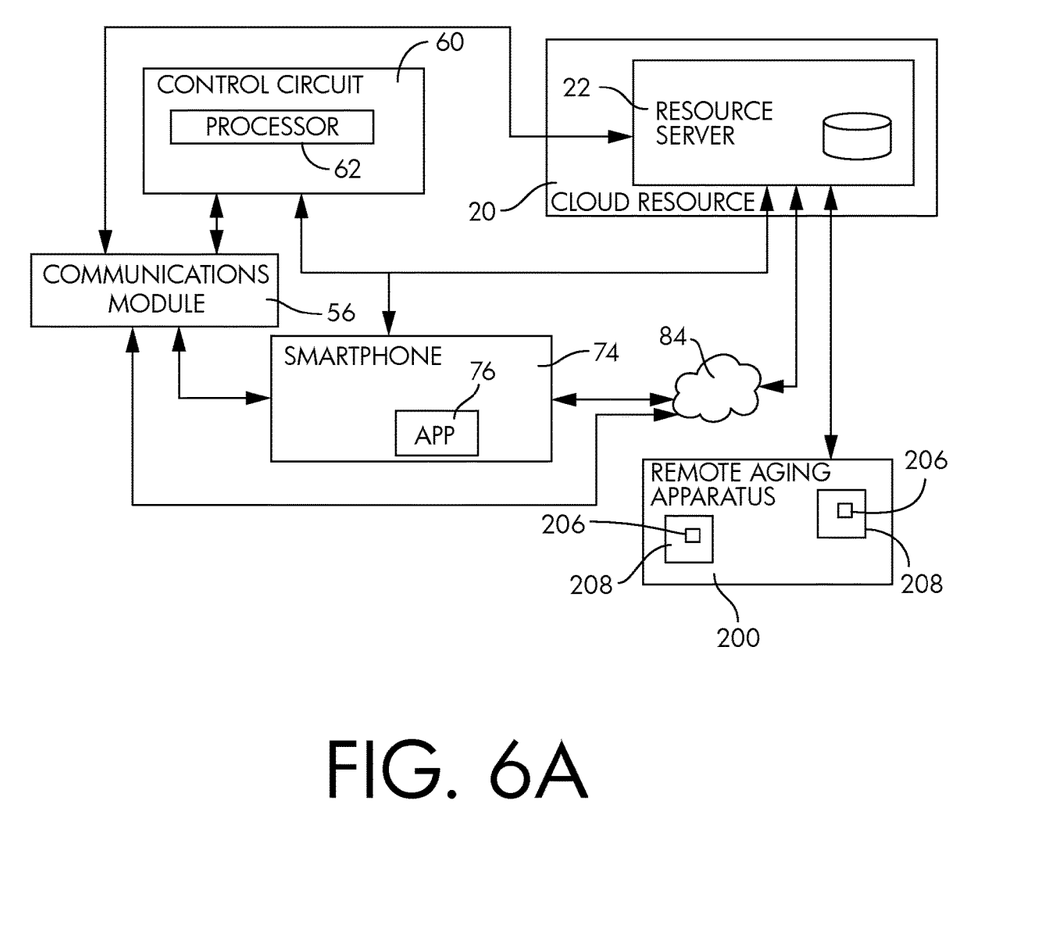
FIG. 6A is a diagram of communications paths in the present system.

FIG. 6A is a diagram of communication paths in the present system. Components described below not shown in FIG. 6A are shown in FIG. 1. Signals indicative of aging parameters are sent from the control circuit 60 to the cloud resource 20 and the resource server 22. Current values may then be monitored via the app 76 on the smartphone 74. The smartphone 74 may periodically interrogate the resource server 22 or may receive "push" signals from the resource server 22.

Prior to initiating an aging process, the aging apparatus 6 is put through a setup routine. The communications module 56 in the aging cabinet 10 is energized and can communicate with the smartphone 74. In effect, the communications module 56 becomes a Wi-Fi hotspot for the smartphone 74. The control circuit 60 includes the control processor 62.

Data indicative of the user 14's Wi-Fi credentials are entered, as by typing on a keyboard in the smartphone 74. The normal Wi-Fi credentials are used. A limited amount of data is stored in the processor 62. The information includes an ID such as a serial number of the processor 62. The control circuit 60 sends the ID of the processor 62 to the cloud resource 20. During set up, there is communication between the smartphone 74 and the cloud resource 20. The user 14 enters its Wi-Fi credentials to the smartphone 74 into the processor 62 via the Wi-Fi hotspot. The user 14 in this manner authorizes the processor 62 to connect to the Internet 84 and to transmit to the cloud resource 20 that the aging cabinet 10 informs the cloud resource 20 that the control circuit 60 can send and receive data. The processor 62 also transmits the Wi-Fi credential of the user 14 to the cloud resource 20 to authorize the user 14 to communicate with the cloud resource 20 regarding the aging apparatus 6.

This same procedure may be used with virtually any number of aging cabinets 10 with Internet 84 access. In the present illustration, aging cabinets 10 at other sites are represented by a remote aging apparatus 200. The remote aging apparatus includes a plurality of aging apparatus units 206 including a control circuit 208. 7The cloud resource 20 comprises a resource server 22 with a database. Data settings are stored in the resource server 22. The cloud resource can receive measurements from all devices around the world. The resource server 22 hosts operating software and a database associated with the service company 26. After setup, the smartphone 74 does not communicate with the control circuit 60. The smartphone 74 communicates with the resource server 22 and is used to monitor operation. The smartphone 74 reads data from the resource server 22.

An initial set of operating parameters may be preset by the service company 26 and stored in the resource server 22. The user 14 can set the desired parameter values such as humidity by transmitting a data package to the resource server 22 containing the desired values. A sampling rate or a periodic sampling schedule for receiving signals at the resource server 22 is included in the app 76 or may be selected at the smartphone 74. Similarly, a rate of sending signals to the control circuit 60 is selectable.

Figure 6B:
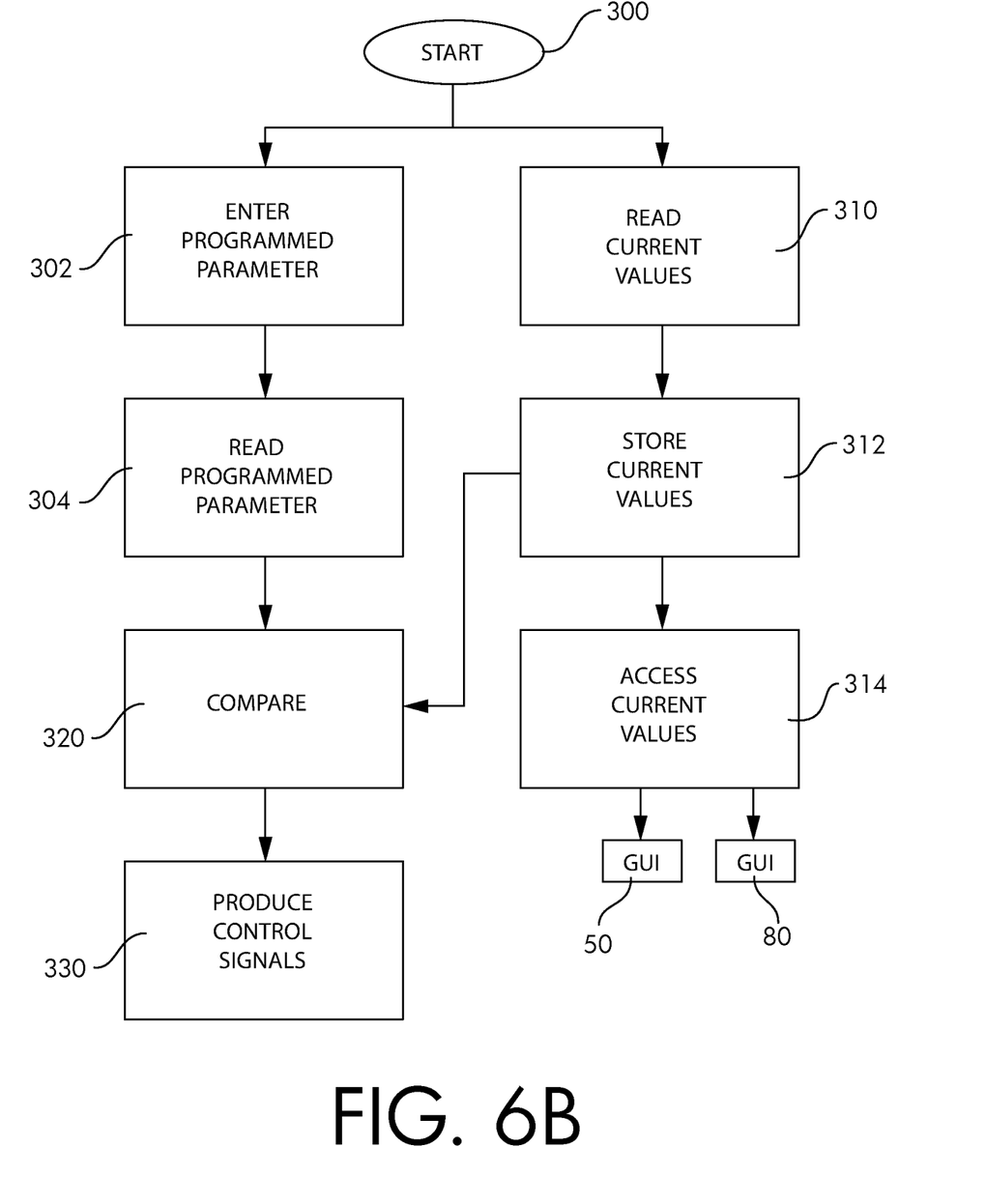
FIG. 6B is a flow chart of a software routine for operating a control circuit in the aging apparatus.

FIG. 6B is a flowchart of a software routine for operating the control circuit 60. Components discussed below are illustrated in FIG. 1. Selected operations below may be performed in parallel or in a different order unless logically impossible. For example, it is not possible to store values before they are entered. Operation begins at block 300. Programmed aging parameters are entered into the resource server 22 at block 302. This entry may be made before the aging apparatus 6 is energized. Entry may be from the app 76 on the smartphone 74, manual entries by the user 14, or values set in the resource server 22 by the service company 26 via the service company server 28. The operation at block 304 begins at a point on the aging timeline when programmed parameter values are to be compared with actual current values. Current aging parameter values are read from the instrumentation module 30 at block 310 and sent via the control circuit 60 to the resource server 22 at block 312. Current values may be accessed at block 314. The values are available to the GUI 54 at the aging apparatus 6 and the GUI 80 at the smartphone 74 in order to report current conditions. In this manner a report is made to users of a current status. Other values such as the current point on the aging timeline may be reported. The values stored in the resource server 22 may be interrogated by the GUI 50 and the GUI 80. Alternatively, a timing circuit in the resource server 22 may push values to the GUI 50 and the GUI 80.

In order to provide closed loop control, current and programmed values are compared at block 320. Current programmed values are provided from block 304. Current actual values from the instrumentation module 30 are provided from block 312. At block 330, error signals are produced for each operating component of the environment apparatus 40 in order to produce desired parameter values. Each control signal is based on a difference at a point on the aging timeline between a programmed setting and actual values read from the instrumentation module 30.

Figure 7A:
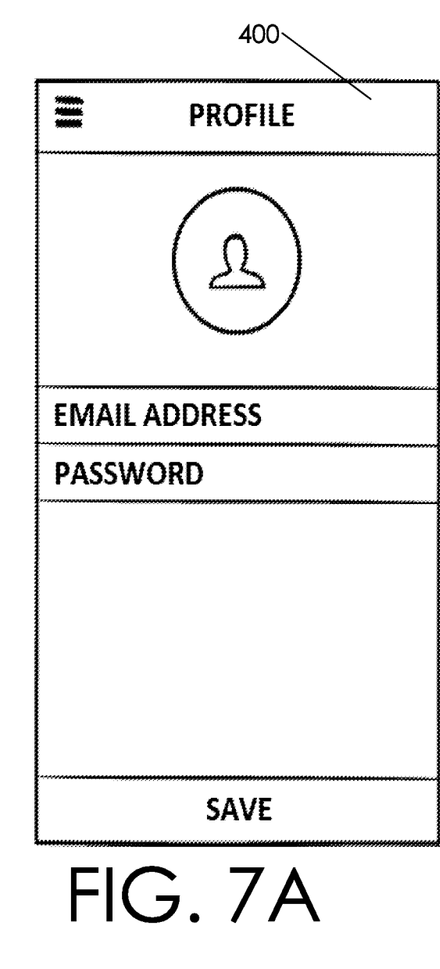
FIGS. 7A, 7B, 7C, 7D, and 7E each illustrate a screen of a graphical user interface (GUI) on a portable interactive device of a user.

FIGS. 7A, 7B, 7C, 7D, and 7E each illustrate a screen of the app GUI 80 of the smartphone 74. FIG. 7A illustrates an opening screen 400. The screen 400 may include identification of the entity operating the aging apparatus 6, pictures or logos, and variable messages to increase customer engagement. The opening screen 400 allows a user to enter a user name, such as an email address and a password in order to access the app 76 (FIG. 1) via entering the screen 401 in FIG. 7B. A first field 402 may contain the name of the user. Profile field 404 allows a user to enter particular personal details. A dashboard field 406 permits coordination of displays and applications available to a user. Video field 408 allows a user to select videos. The videos could include records of surveillance of the aging apparatus 6. Report field 410 enables a user to request current or recorded raw or processed data. Settings field 412 is accessed in order to control various criteria such as desired aging temperature, duration, or selected alarm levels. Support field 414 may provide access to a customer support facility of a manufacturer or distributor of the aging apparatus 6, for example the service company 26.

Figure 7B:
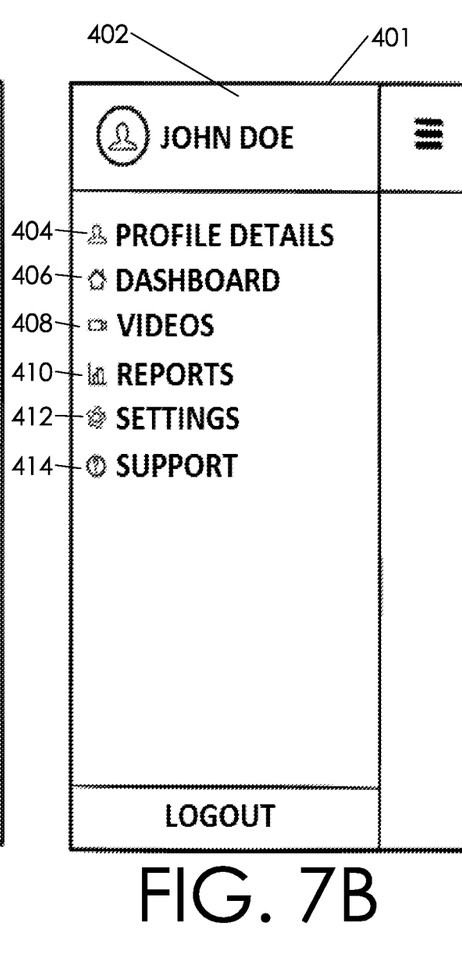
Figure 7C:
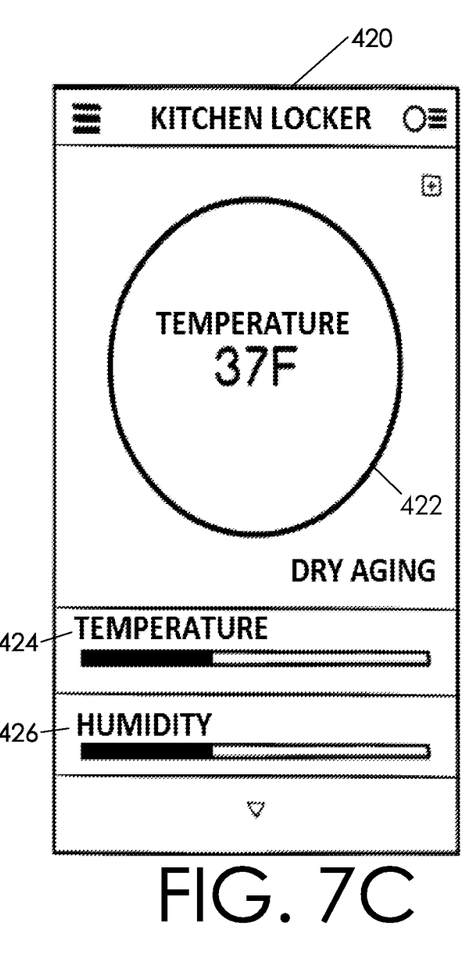

FIG. 7C illustrates a report screen 420 which may be accessed by selecting field 410 (FIG. 7B). A first parameter field 422 is used to illustrate a value of a parameter, for example temperature. The first parameter field 422 may have a circular or other form. The first parameter field 422 may display digits and be color-coded to transmit additional information to a user. Second and third parameter fields 424 and 426 may be provided to display other parameters in graphical form. Any number of parameter fields may be provided and many different ways of conveying information may be used, e.g. charts, gauges, or numerical listings.

Figure 7D:
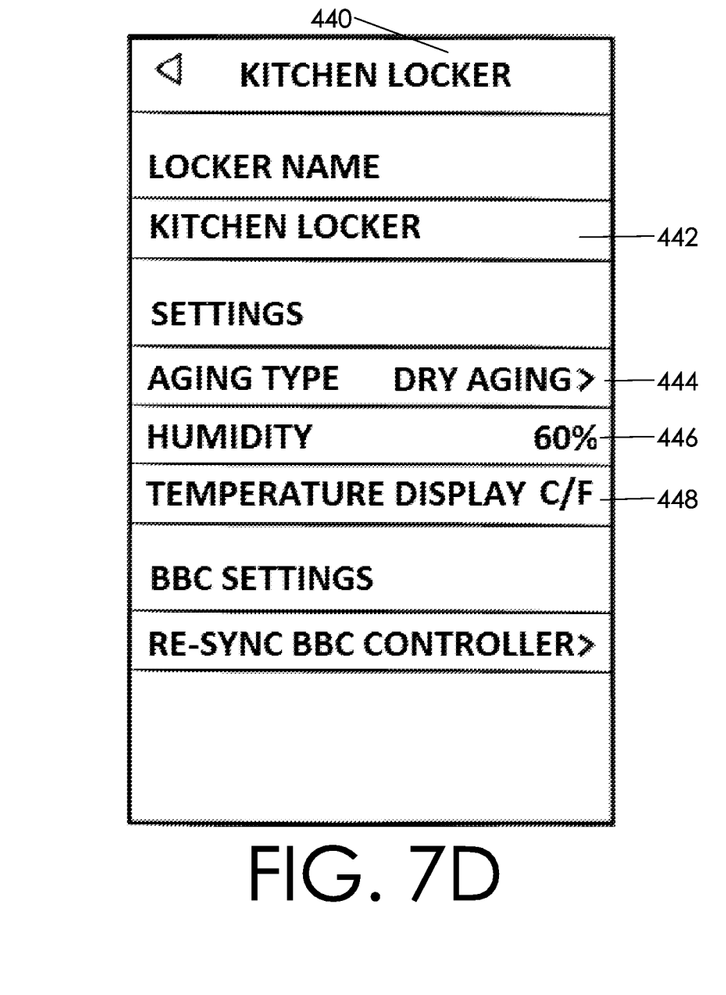

FIG. 7D illustrates a settings screen 440 accessed from the field 412 (FIG. 7B). A field may be provided for each parameter that a user may wish to vary. In the current illustration, an identification field 442 specifies the name of the apparatus being accessed. The app 76 may be used to control more than one aging apparatus 6. An aging field 444 may be provided for a user to select a type of aging, for example dry aging. A first parameter settings field 446 may be used for setting a parameter such as humidity. Separate parameter settings fields may be provided, or one parameter settings field 446 may be provided and used to select each of a plurality of parameters separately. A display field 448 is provided for selecting characteristics of display screens. These may include selection of Fahrenheit or Celsius temperature, correlation of a specific condition with a color in the first parameter field 422 in FIG. 7C, or other desired displays.

Figure 7E:
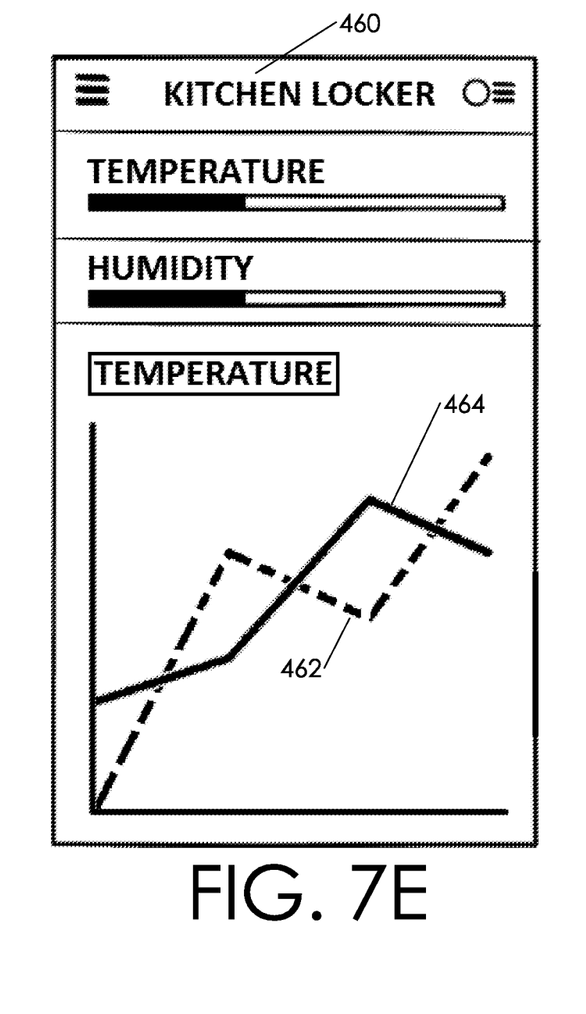

FIG. 7E illustrates a data field 460. The data field 460 may have a graphical display field 462. In the illustration of FIG. 7E, a graph 464 shows the value of a parameter, e.g., temperature, versus time. The graphical display field 462 may be provided with data that has been processed. For example, a rolling average of a parameter could be provided. Deviations of selected parameters from selected criteria may be recorded. Other useful information may be provided, such as energy consumption, change in weight of meat, or composite values collected over many aging cycles. The GUI 80 permits many levels of interaction either on-site or remotely.

Figure 8:
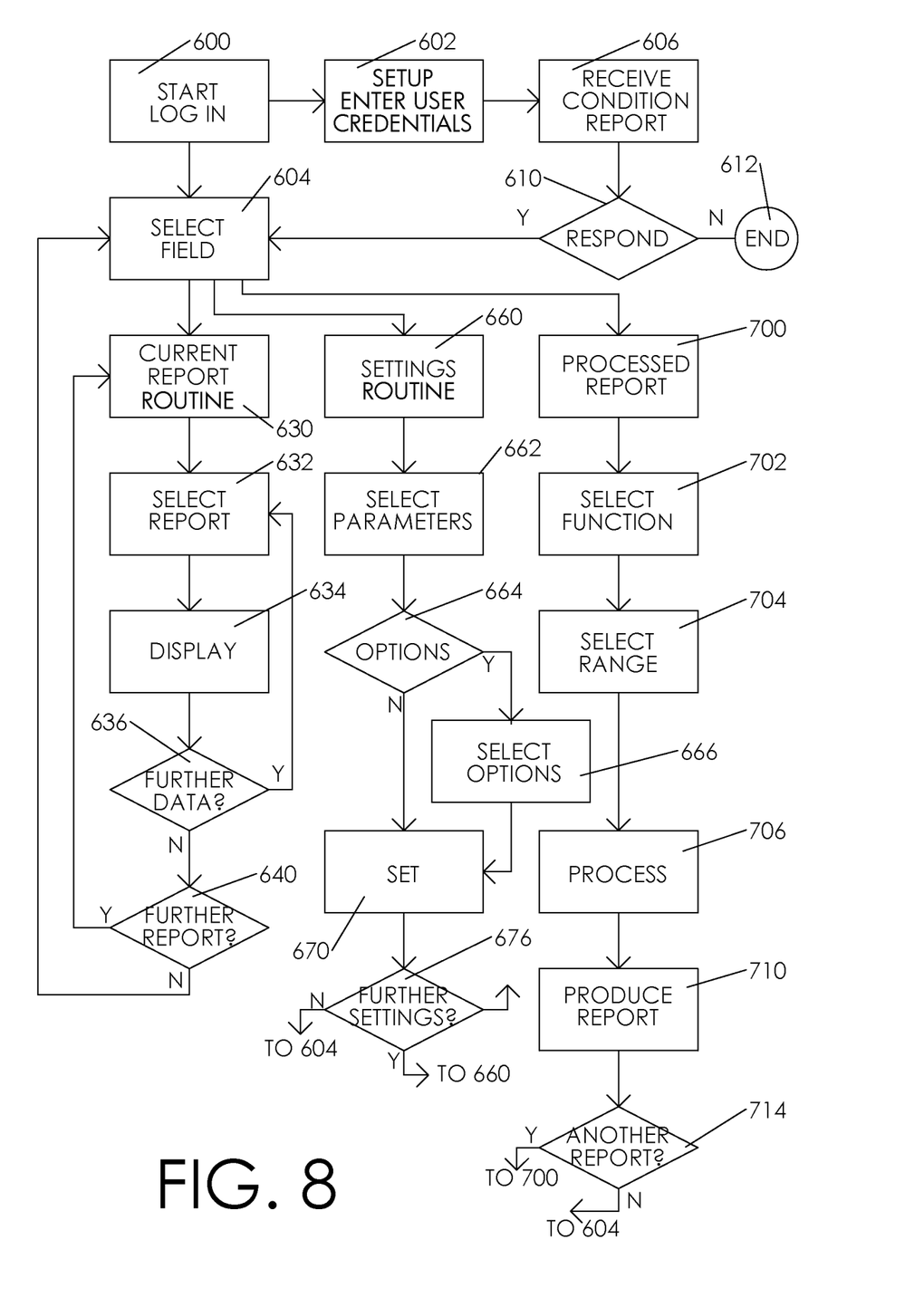
FIG. 8 is a flowchart illustrating operation of the app included in a portable interactive device such as a smart phone.

FIG. 8 is a flowchart illustrating operation of the app included in a portable interactive device 12 such as the smartphone 74. Operation begins at block 600 when a user accesses the app 76 (FIG. 1) on the smartphone 74. At block 602, the user connects with the control circuit 60. The user 14 performs the setup operation described above with respect to FIG. 6A.

At block 604 operation proceeds to the opening screen 400 (FIG. 7A). The user may select one of the fields 404-414 from FIGS. 7A and 7B. At the same time, the app 76, at block 604, automatically sends a query to the control circuit 60. Any messages that have been flagged with an urgency code are produced at block 606. At block 606, any such urgent reports may be displayed on the opening screen 400. At block 610, a user has an option to respond to any urgent message. Responses may be made, for example, by providing a response option on the screen 401. Alternatively, a field may be provided in the urgent message screen to immediately perform a custom or preselected response. At block 612, the initial automatic report sequence ends.

From block 600, a user may proceed to a selected routine for interacting with the aging apparatus 6. At block 630, a user may enter a current reports routine. At block 632 a parameter is selected, and a display comprising a current parameter report is provided at block 634. At block 636, a user is given an option to request another data point. If the user request another data point, operation proceeds back to block 632, where another value is requested. If not, operation proceeds to block 640, wherein the user interface asks whether to repeat the current reports routine. If not, operation returns to block 602 at which a user may select a key. If so, operation returns to block 630. If not, operation returns to block 604.

From block 604 the user may proceed to block 660. At block 660 a user may enter a settings routine. A settings routine includes a selection of one or more aging parameters, values, and times in the aging timeline when these values ought to be used. At block 662 a user selects a setting to be made. At block 664, an option is provided in order to permit optional forms of setting the parameter. These include setting particular values, setting differences, or setting routines. If the offered option is selected, operation proceeds to block 666 where the option is taken, and then block 670. If the offered option is not selected, operation proceeds directly to block 670. At block 670 settings are made and operation proceeds to block 676. At block 676, the user is given the option to make further settings. If the user does select further settings, operation returns to block 660 and if the user does not select further settings, the operation returns to block 604.

A user may enter a processed reports routine at block 700. Processed reports may comprise information regarding multiple aging procedures over time. Comparisons of the parameters versus resulting aging characteristics may be performed in order to populate a database or to calculate information for a particular aging occurrence. At block 702 an operation, parameter, or other function is selected on which a report is to be produced. At block 704 a data range or other range is selected from which data will be provided in order to calculate the desired information. At block 706 data is processed. At block 710, a report is produced. At block 714 a user makes a choice as to whether to return to the front page of the GUI 80 at block 604 or back to block 700 for another report.

Meat is aged in an aging chamber by execution of a preselected routine in which selected values of temperature and humidity are provided for preselected periods of time. Condition-responsive sensors provide both current and historical information. A user is enabled to communicate with control and monitoring apparatus during the aging routine. Communication is enabled via a communications link between the aging apparatus and a portable interactive device such as a smart phone. Through an app, the user may vary operational parameters. The user may vary the aging process, accelerate it, or stop it. Communication with the control unit may also be made via a local or networked remote control unit. A user may select various combinations of parameters for aging, such as temperature, humidity, and duration. The user may also process past data to derive information on which to base new aging routines. The method and apparatus may be used for curing applications in which a user wishes to control time, temperature, humidity, and air flow.

While the invention has been described in terms of various embodiments, those of ordinary skill in the art will recognize that the invention is not limited to the embodiments described but can be practiced with modification and alteration within the spirit and scope of the appended claims. The description is thus to be regarded as illustrative rather than limiting. Operations can be added to or deleted from any of the methods and information can be added or subtracted from any of the described messages without departing from the basic scope of the present invention. Any number of variations of the inventive concept are anticipated within the scope and spirit of the present invention. In this regard, the particular illustrated example embodiments are not provided to limit the invention but merely to illustrate it.

The invention claimed is:

1. A meat aging apparatus comprising:
an aging cabinet;
an aging chamber located in said cabinet,
an environment apparatus located below said aging chamber and comprising a fan, a humidifier receiving information from a humidity sensor, and a refrigeration compressor, said humidifier comprising a piezoelectric transducer whereby the humidifier produces a mist and wherein said fan moves mist into air inside said aging chamber;
an instrumentation module comprising sensors monitoring environmental conditions including a thermostat and a hygrometer and producing data outputs indicative of environmental conditions;
a control circuit coupled to receive the data outputs from said instrumentation module and to provide control signals to said environment apparatus and comprising a control circuit processor;
a communications interface, said control circuit being coupled to said communications interface for communication therewith, and said communications interface having a terminal for coupling to provide communications between said control circuit and a cloud resource, the cloud resource comprising a server hosting an aging protocol;
a portable interactive device coupled for interactions with said control circuit and the cloud resource, said portable interactive device having a setup mode and communicating with said control circuit in the setup mode, the setup mode comprising loading operating values into said control circuit, and having an operating mode communicating with said cloud resource via said communications interface;
said communications interface further providing signal paths between said control circuit, said cloud resource, and said portable interactive device;
said control circuit responding to the aging protocol via communications between said control circuit processor and the cloud resource, the communications comprising commands for implementing the aging protocol; and
said control circuit coupled to said communications interface and receiving threshold values comprising current values according to the aging protocol and comparing current values sensed by said instrumentation module, said control circuit producing at least a temperature error signal and a humidity error signal the humidity error signal being coupled from the humidity sensor to control the humidifier.

2. The meat aging apparatus according to claim 1 wherein said aging cabinet is the size of a residential refrigerator.

3. The meat aging apparatus according to claim 1 further comprising an alarm system comparing a current aging parameter value to a current preselected threshold level selected from an aging protocol defined by a preselected value versus time and providing an alarm signal to said portable interactive device in response to a current aging parameter value crossing a respective threshold, said portable interactive device comprising an app operable to selectively alter parameters in a current aging protocol.

4. The meat aging apparatus according to claim 3 wherein said communications interface permits communication between said portable interactive device and said cloud resource and wherein said communications interface permits direct communications between said portable interactive device and said control circuit.

5. The meat aging apparatus according to claim 4 further comprising a graphical user interface producing a selected visual representation in response to data monitored over time and a non-transitory programmed medium which when executed on a digital processer causes the processor to perform the step of translating environmental parameter readings into graphical representations on said graphical user interface.

6. The meat aging apparatus according to claim 5 wherein said non-transitory programmed medium further causes the processor to transmit commands via communications paths between said portable interactive device and said control circuit and said cloud resource, further wherein the control circuit processor interacts with the aging protocol hosted in said cloud resource to operate the meat aging apparatus to respond to current conditions.

7. The meat aging apparatus according to claim 6 wherein the non-transitory programmed medium is responsive to selection by a user to modify current value of at least one parameter, whereby the aging process is modified.

\* \* \* \* \*